US012320125B2

(12) United States Patent
Holm et al.

(10) Patent No.: US 12,320,125 B2
(45) Date of Patent: Jun. 3, 2025

(54) FASTENER DRIVING MACHINE FOR INSTALLING FORMED SHEETING

(71) Applicants: Will Holm, Cedar City, UT (US); Bendon Holm, Cedar City, UT (US)

(72) Inventors: Will Holm, Cedar City, UT (US); Bendon Holm, Cedar City, UT (US)

( * ) Notice: Subject to any disclaimer, the term of this patent is extended or adjusted under 35 U.S.C. 154(b) by 234 days.

(21) Appl. No.: 18/329,552

(22) Filed: Jun. 5, 2023

(65) Prior Publication Data

US 2023/0392380 A1 Dec. 7, 2023

Related U.S. Application Data

(60) Provisional application No. 63/366,002, filed on Jun. 7, 2022.

(51) Int. Cl.
*E04D 15/04* (2006.01)
*B25B 23/04* (2006.01)

(52) U.S. Cl.
CPC .............. *E04D 15/04* (2013.01); *B25B 23/04* (2013.01); *E04D 2015/047* (2013.01)

(58) Field of Classification Search
CPC ... E04D 15/04; E04D 2015/047; B25B 23/04; B25B 23/06; B25B 21/002
See application file for complete search history.

(56) References Cited

U.S. PATENT DOCUMENTS

| | | | | |
|---|---|---|---|---|
| 5,378,302 | A * | 1/1995 | Meister | B29C 65/103 156/499 |
| 8,074,348 | B2 * | 12/2011 | Haytayan | B25B 23/045 29/811.2 |
| 2012/0174525 | A1 * | 7/2012 | Hinshaw | B25C 1/00 52/749.1 |
| 2015/0284960 | A1 * | 10/2015 | Bleibler | B29C 63/02 156/64 |
| 2020/0039304 | A1 * | 2/2020 | Parks | B23P 19/069 |
| 2021/0394316 | A1 * | 12/2021 | Beldon | E04D 15/04 |

* cited by examiner

*Primary Examiner* — Patrick J Maestri

(57) ABSTRACT

A fastener installing vehicle includes an articulating frame having at least one mounting rail. A plurality of fastener installing assemblies are installed along the mounting rail with each including a mounting rail grip, a rotary impact driver, a fastener magazine, and a fastener-orienting tip. A power transmission system is capable of rotating wheels or tracks counter to each other to provide zero turning radius maneuverability. The fastener installing assembly has a feed tube communicating between the fastener magazine and the fastener-orienting tip, while the rotary impact driver is extendable along an axis transverse to the mounting rail. The rotary impact driver is electrically powered with means for monitoring electric current applied to it and process controller programmed to stop it when a predetermined applied current level has been met. The frame preferably includes lighting for illuminating a work area where fasteners are installed.

18 Claims, 4 Drawing Sheets

FASTENER DRIVING MACHINE FOR INSTALLING FORMED SHEETING

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

CROSS REFERENCE TO RELATED APPLICATION

This U.S. non-provisional utility patent application claims the benefit of and priority to U.S. provisional patent application 63/366,002 "Fastener Driving Machine for Installing Formed Sheeting," filed 7 Jun. 2022. The entire contents of U.S. provisional patent application 63/366,002 "Fastener Driving Machine for Installing Formed Sheeting," filed 7 Jun. 2022, including all images in the appendix to the specification, are hereby incorporated into this document by reference.

FIELD

The invention relates to a machine for installing linearly spaced-apart pluralities of fasteners into sheet materials and support framing therefor.

BACKGROUND

In the construction of roofing or decking, there is a demand for improved safety, speed, and uniform quality within the task of installing fasteners to secure sheet materials such as corrugated metal or plastic sheets to prepared structural framing. For large buildings having an expansive roof, flooring, or decking to be installed, the correspondingly large number of fasteners used in the construction represents a daunting, difficult, and tedious task. Construction workers are also exposed to outdoor elements as well as the reflected solar radiation from the roof decking, which heightens risks, strains efficient work practice, and exacerbates worker fatigue. Also, it is difficult for one or more laborers manually installing individual fasteners to assure uniformity of fastener holding strength and completeness of insertion depth from one fastener to the next over a course of tens or hundreds of thousands of fasteners to be installed.

Thus there remains a need for an automated machine for installing fasteners at greater locational accuracy, more uniformity of reliable holding strength from one fastener to the next, at a higher effective and efficient production rate, and at far lower labor intensity and risk compared to manual and individual install methods.

BRIEF DESCRIPTION

A primary objective of the invention is to provide a machine for installing sets of screws into sheet material to be supported by structural framing. A corollary objective of the invention is to provide and automated machine where the tasks of handling fasteners, aligning them with powered fastener driving machines, and feeding fasteners from bulk supplies to the driving machines.

Another objective of the invention is to relieve a construction worker from repetitive crouching tasks while on a partially assembled roof by providing an automatic fastener positioning and installing machine configured as a piloted vehicle capable of supporting a user as a driver in control of the machine. A corollary objective of the invention is to provide such a machine capable of operating in an autonomous mode.

Because it is desirable to be able to install fasteners along the perimeter of the roof with the installing mechanisms of the vehicle operating up to and at the very edge of the roof, for additional safety it is a preferable corollary objective of the invention to provide a vehicle capable of turning around within its own foot print. This is referred to as a "zero turn radius" vehicle.

It is usually desirable to install sheets of roofing materials so as to establish overlapping regions and edges. These overlapping regions of roofing define preferred installation zones for the fasteners to be installed as they perforate the material and secure the sheets to underlying joists. Since these zones tend to be lenticular, another objective of the invention is to provide means to deploy fastener installing machines in gang as a linearly spaced apart array so that pluralities of fasteners may be installed simultaneously for greater production efficiency.

As a corollary to the previous objective, since the vehicle's direction of travel may not always align with the lenticular orientation of the next fastener installation zone being approaches, another objective of the invention is to provide means for orienting the linearly spaced apart array of fastener installing machines to best align with the fastener installation zone.

Additional objectives of the invention include providing lifting affordances so that the vehicle may be transported from the ground to a roof via crane, and providing illumination for optical quality control verification of installed fasteners and for general safety when working in less than ideal lighting conditions ands to provide safety in that illuminated vehicles may be easily seen by other workers on a roof.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sublabel, it is intended to refer to all such multiple similar components.

DETAILED DESCRIPTION OF CERTAIN EMBODIMENTS

Figure 1A:
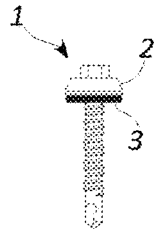
FIG. 1*a* shows a typical threaded roofing fastener having a hexagonal drive feature in its head and a water resistant gasket or washer affixed to the underside of the fastener head.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise. Also in this specification, the term "means for . . . " as used herein including the claims, is to be interpreted according to 35 USC 112 paragraph 6.

The invention is a fastener installing vehicle that includes an articulating frame having at least one mounting rail. A plurality of fastener installing assemblies are installed along the mounting rail with each including a mounting rail grip, a rotary impact driver, a fastener magazine, and a fastener-orienting tip. A power transmission system is capable of rotating wheels or tracks counter to each other to provide zero turning radius maneuverability. The fastener installing assembly has a feed tube communicating between the fastener magazine and the fastener-orienting tip, which is extendable along an axis transverse to the mounting rail. The rotary impact driver is electrically powered with means for monitoring electric current applied to it and process controller programmed to stop it when a predetermined applied current level has been met. The frame preferably includes lighting for illuminating a work area where fasteners are installed.

Referring now to the figures, FIG. 1 shows a typical threaded roofing fastener [1.] Many of these have a hexagonal drive feature in the fastener head [2] and a water resistant gasket [3] or washer affixed to the underside of the head. These fasteners may also include drive features such as slotted heads or socket heads. When roofing material is being installed over a frame or a set of joists, the sheeting is overlapped and the fasteners are installed at the overlap. Some sheeting systems include an additional strip of material at the overlap site, which may include locking means or seams so that once a first sheet is secured, the adjacent sheet snaps into or otherwise locks to the first sheet.

Figure 1B:
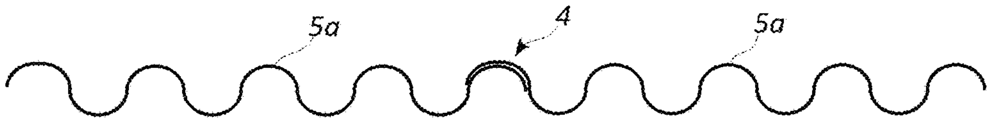
FIG. 1*b* shows a stylized end view of two overlapped sheets of corrugated roofing material.

FIG. 1*b* shows a stylized end view of two overlapped sheets of corrugated roofing material [5*a*.] The overlapping zone is identified as [4] in this figure. Fasteners driven through this zone and into a joist will secure both sheets simultaneously.

Figure 1C:
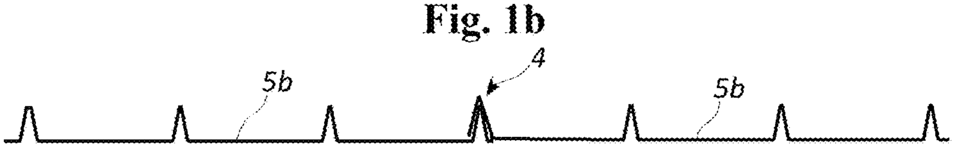
FIG. 1*c* shows a stylized end view of two overlapped sheets of roofing material comprising a repeating pattern of triangular ribs.

FIG. 1*c* shows a stylized end view of two overlapped sheets of roofing material [5*b*] comprising a repeating pattern of triangular ribs. The overlapping zone is identified as [4] in this figure. Fasteners driven through this zone and into a joist will secure both sheets simultaneously.

Figure 1D:
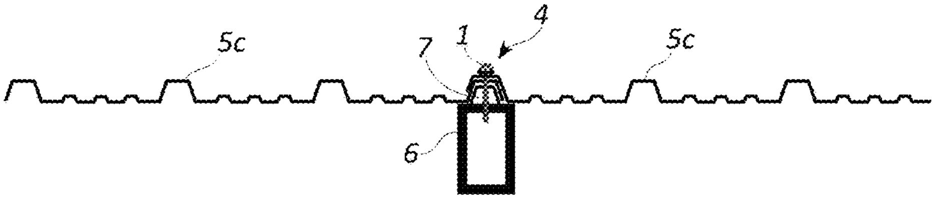
FIG. 1*d* shows a stylized end view of two overlapped sheets of roofing material comprising a first repeating pattern of larger trapezoidal ribs and sets of repeating patterns of a second, smaller trapezoidal ribs disposed interstitially within the first pattern.

FIG. 1*d* shows a stylized end view of two overlapped sheets of roofing material [5*c*] comprising a first repeating pattern of larger trapezoidal ribs and sets of repeating patterns of a second, smaller trapezoidal ribs disposed interstitially within the first pattern. The overlapping zone is identified as [4] in this figure. Fasteners [1] driven through this zone and into a joist will secure both sheets simultaneously. This type of roofing material is also installed with an underside support [7] positioned atop the joist [6] but beneath the overlapping zone of the material sheets. The fasteners pierce both adjacent sheets, pass through the support, and secure to the joist by their tips.

Figure 2A:
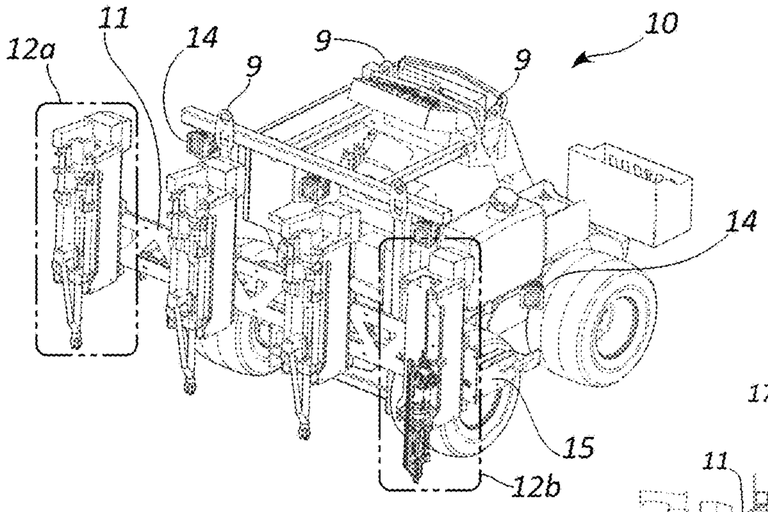
FIG. 2*a* shows an oblique front left top view of an embodiment of a fastener driving machine in accordance with the invention.

FIG. 2*a* shows an oblique front left top view of an embodiment of a fastener driving machine in accordance with the invention. A plurality of fastener installing machines [12*a*] are secured to a mounting rail [11] of an articulating frame in a linearly spaced-apart array. The mounting rail attaches to a self-propelled vehicle portion of the invention by means of connecting rails [15.] A fastener installing machine of an alternative design [12*b*] is shown as one instance among the array. For safety and for operation during low light conditions, lights [14] may be mounted to the frame or onto the vehicle or both. Frame mounted lighting may also be used as part of a vision system for inspection and quality control. This system may also include cameras for recording and documenting efficacy of each fastener installed and for monitoring of quality improvement metrics such as process capability indices (Cpk.) Lifting affordances [9] allow a crane to convey the machine or vehicle from the ground or a delivery truck bed up to a roof at a material installation job site.

Figure 2B:
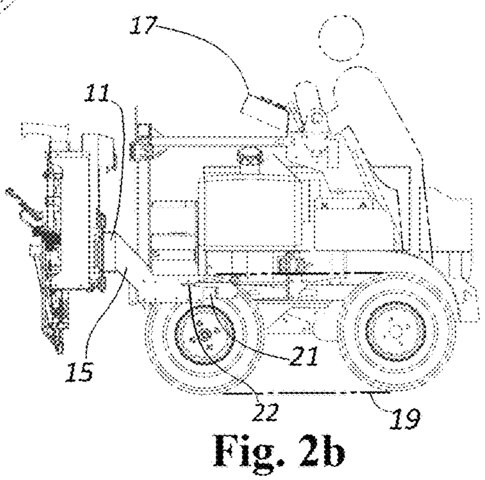
FIG. 2*b* shows a left side elevation view of the fastener driving machine of FIG. 2*a*.

FIG. 2*b* shows a left side elevation view of the fastener driving machine of FIG. 2*a*. The mounting rail attaches to a self-propelled vehicle portion of the invention by means of connecting rails [15.] The connecting rails are secured to the vehicle frame and the mounting rail is pivotable with respect to its support frame. A [21] driver uses a control panel to monitor operations of the fastener installing machines. The articulation of the mounting rails is effected by pistons such as gas cylinders [21] or hydraulic cylinders, or rotary power thread extension and retraction mechanisms. At least one piston or power cylinder is connected between the vehicle frame and a pivotable portion of the articulated frame. Actuation of the piston is controlled at the control panel. Motion of the pivotable portion of the frame is preferably snubbed by a dashpot [22] such as a gas shock absorber. Traction for the vehicle portion of the invention may be provided by arrays of rotary components such as wheels, or the rotary components may be drivers and idlers confined within a continuous traction belt [19,] tracks, or treads.

Figure 2C:
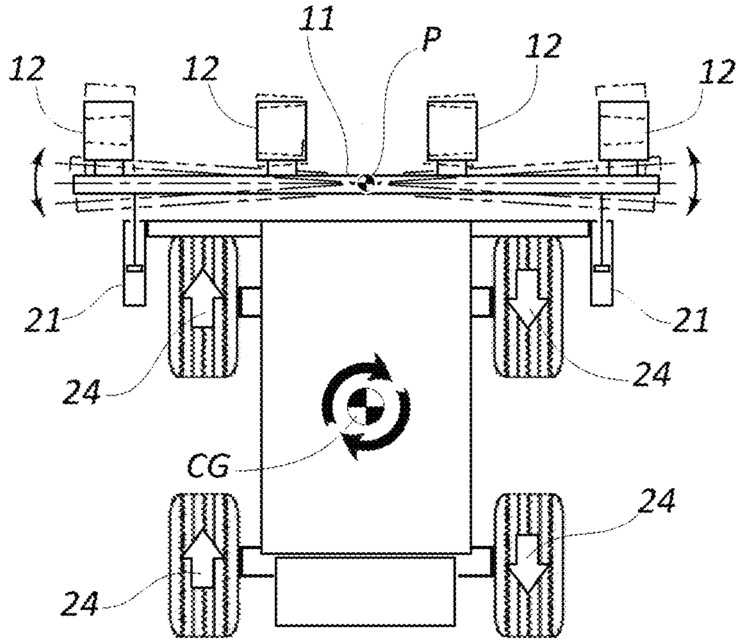
FIG. 2*c* shows a stylized top view of a generic embodiment of a fastener driving machine in accordance with the invention.

FIG. 2*c* shows a stylized top view of a generic embodiment of a fastener driving machine in accordance with the invention. The vehicle portion includes a source of rotary power such as a motor or engine and a power transmission which delivers motive power to rotary components [24] which may preferably be two arrays of wheels having solid or pneumatic tires. The rotary components define axes of rotation. In the example shown, by driving a first array of wheels on the left side in a forward rotation direction while also driving a second array of wheels on the right side of the vehicle in a reverse direction, the vehicle will rotate at a pivot point [CG] somewhere in between the two arrays of wheels, which thus provides a zero turning radius capability particularly useful for installing the last set of fasteners of a roof sheet at the edge of a roof. The vehicle may be pivoted to a next course of fastener install sites without fear of driving off the edge of the roof.

The articulated frame includes a pivotable mounting rail [11] to which a linearly spaced-apart array of fastening installer machines [12] are secured. The pivotable frame may be free-floating or may be actuated by at least one power cylinder [21] which may be pneumatic, hydraulic, or a solenoid or a power thread driven extensible device. The articulated frame pivots about a pivot point [P] which is preferable at or near its midpoint. To reduce angular jiggling, a rotation reducing snubber is preferably included in the frame assembly. The snubber may be a rotary damper installed at a pivot point of the assembly or it may be a linear dashpot installed at an end or an intermediate portion of the articulating frame which is a point other than the pivot point of the frame.

Figure 3A:
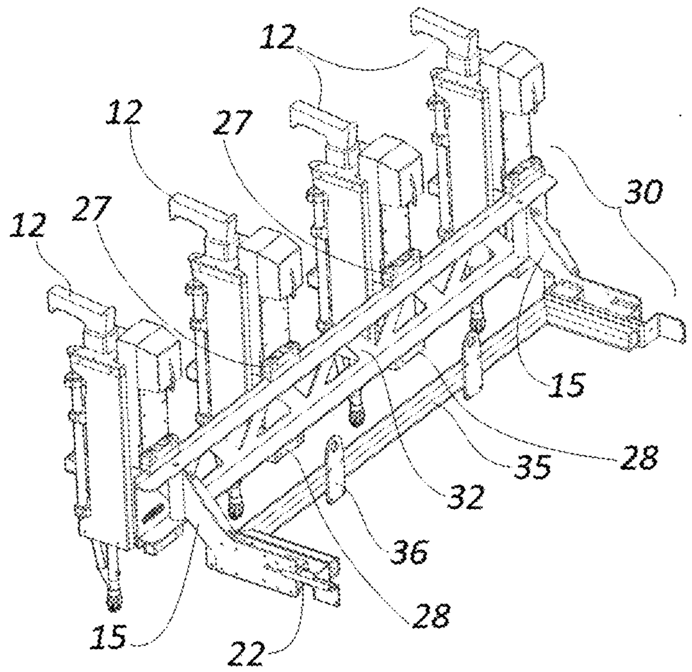
FIG. 3*a* shows an oblique left top rear view of an articulated support frame for an array of fastener installing assemblies in accordance with the invention.

FIG. 3*a* shows an oblique left top rear view of an articulated support frame [30] for an array of fastener installing assemblies [12] in accordance with the invention. The frame assembly incudes non-articulating structural members [35] which attach to the vehicle frame, and an articulating frame which includes moveable supports [15] which support the mounting rail frame [32.] Each fastener installing assembly includes upper [27] and lower [28] mounting rail grips which clamp each such assembly in locations spaced apart along the length of the mounting rail frame. The line of action of a fastener installing machine is defined by the axis of the rotary impact subassembly or motor. In a preferable embodiment this line of action resides perpendicular to or transverse to a longitudinal axis defined by the mounting rails of the mounting rail frame. The non-articulating structural members of the frame may also preferably include lifting affordances [36] which assist in installing the mechanism seen here to the frame of the vehicle portion of the invention. The lifting affordances may also be used to lift the entire vehicle for delivery by crane from the ground to an elevated roof surface for an install job.

Figure 3B:
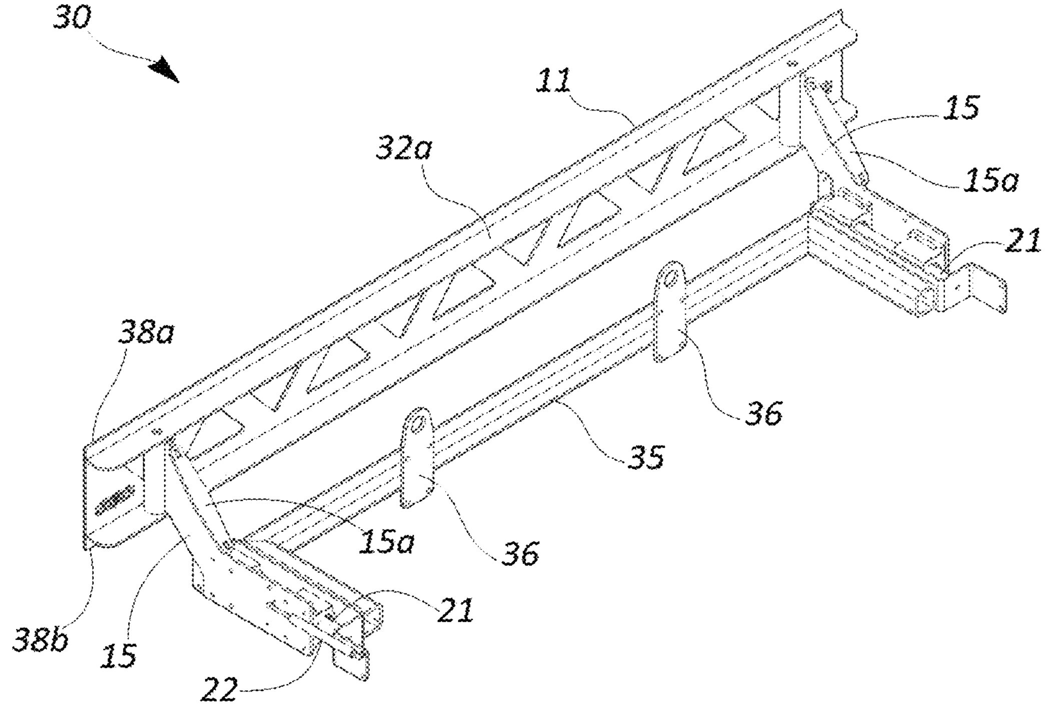
FIG. 3*b* shows the articulated support frame of FIG. 3*a* but with the fastener installing assembly omitted for clarity.

FIG. 3*b* shows the articulated support frame of FIG. 3*a* but with the fastener installing assembly omitted for clarity. In a preferable embodiment, the articulating frame [11] is stiffened by ribs perpendicular to a plane defined by the upper mounting rail [38*a*] and the lower mounting rail [38*b*.] Similarly, the moveable supports [15] may also be preferably stiffened with transverse ribs [15*a*] which increase the sectional strength against bending. The non-articulating structural members [35] of the frame may also preferably include lifting affordances [36] which assist in installing the mechanism seen here to the frame of the vehicle portion of the invention. Articulation forces are provided by pistons such as gas cylinders [21] or hydraulic cylinders, or rotary power thread extension and retraction mechanisms. Motion of the pivot-able portion of the frame is preferably snubbed by a dashpot [22] such as a gas shock absorber.

Figure 4A:
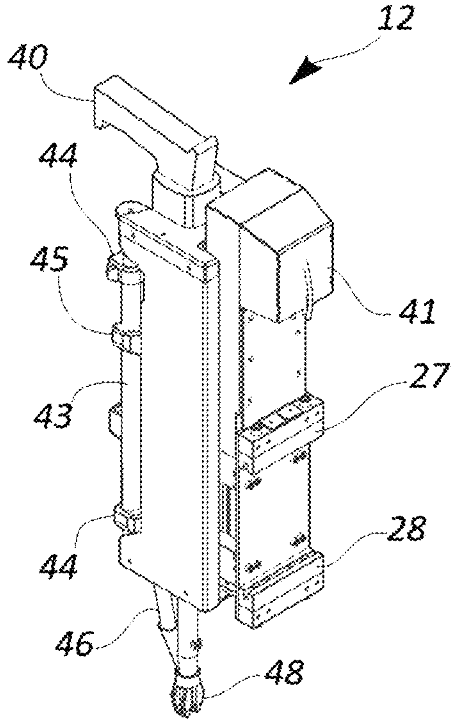
FIG. 4*a* shows an oblique rear top left view of an embodiment of a fastener installing assembly in accordance with the invention.

FIG. 4*a* shows an oblique rear top left view of an embodiment of a fastener installing assembly [12] in accordance with the invention. Electrical power is delivered to a rotary impact driver [40] which may also be or be referred to as an impact drill. This subassembly provides torsional impulses to an output shaft which is attached to an extendable drive shaft or coupling mechanism. A distal end of the extendable drive shaft includes a socket or a bit which is complementary to the drive features of the fasteners being installed, such as a hex socket complementary or to a hex head fastener or a hexagonal or square drive bit being complementary to a torque-receiving cavity in the fastener head.

The drill is housed within an enclosure and mounted upon a drill frame comprising linear slides or guides [43] and cross members [44] at the ends of the guide tubes. The drill is secured to one such end cross member and an intermediate cross member [45.] The drill frame is also attached to the movable portion of a linear drive system for controlled motions on command of an onboard vehicle computer or by the operator. Fasteners are delivered from a magazine through a feed tube [46] to a fastener-orienting tip [48] beneath and directly in line with the bit attached to the rotary impact drill. Electric power for the drill is delivered to a local step-down transformer [41] attached to the enclosure. The enclosure secures to mounting rails of the articulating frame by mounting rail grips [27] and [28.]

Figure 4B:
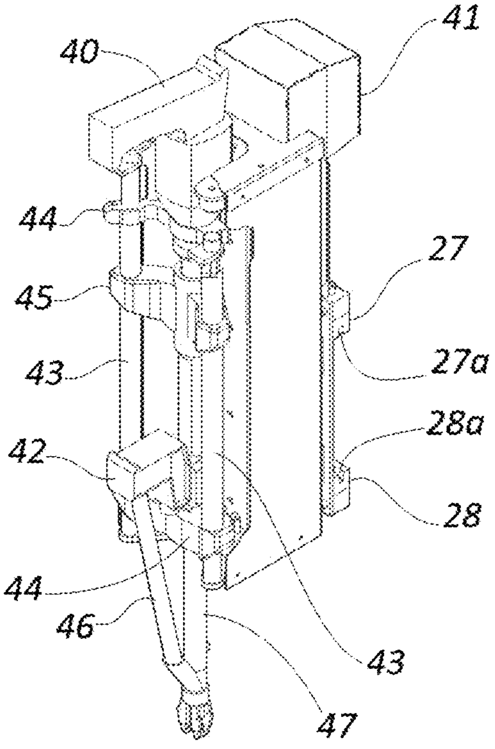
FIG. 4*b* shows an oblique front top left view of the fastener installing assembly of FIG. 4*a*.

FIG. 4*b* shows an oblique front top left view of the fastener installing assembly of FIG. 4*a*. This view shows the guide tubes [43] and the rotary impact drill [40] secured to an upper of the two guide tube end cross bars [44.] The rotary impact drill is additionally secured to the drill frame by an intermediate cross bar [45.] The step-down transformer [41] for powering the drill is also seen abaft of the drill. Fasteners are loaded and stored in bulk in a fastener magazine [42] which may include internal opposed rails which catch opposite sides of the underside of a fastener head so that the shank of the fastener drops down between the rails and enters the feed tube [46] oriented point-down and ready to penetrate the roofing material sheets. A drill bit extension shroud [47] hoses an extension rod connecting the chuck of the rotary impact drill top the driving bit which engages and turns the fastener head by applying impulses of torque. The enclosure secures to mounting rails of the articulating frame by mounting rail grips [27] and [28] which include gripping grooves [27*a*] and [28*a*] complementary to the mounting rails of the articulating frame.

Figure 4C:
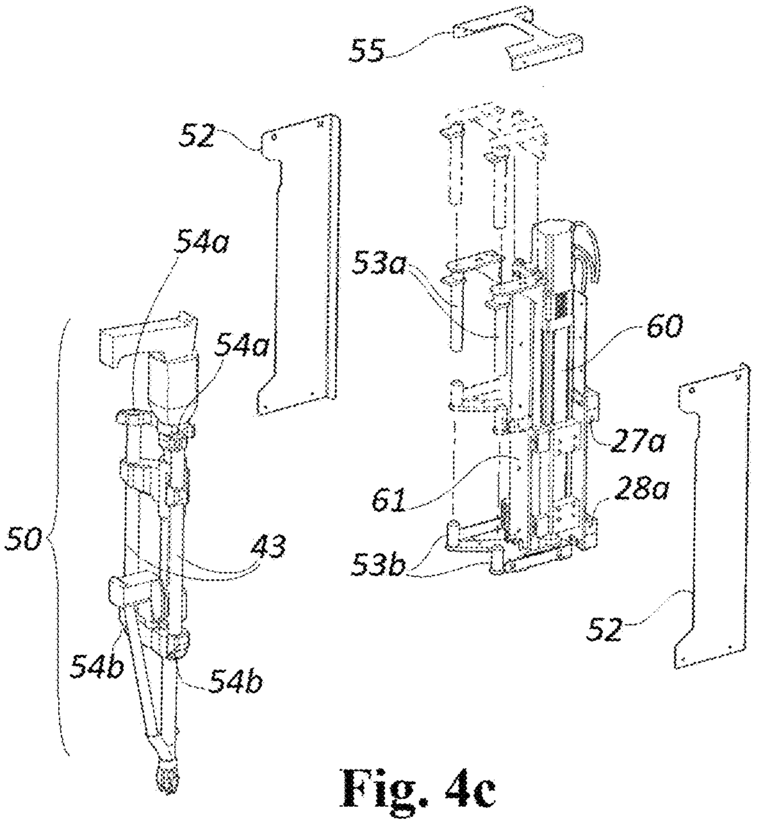
FIG. 4*c* shows an oblique exploded view of some of the components of the fastener installing assembly shown in FIG. 4*b*, including a guide and feed subassembly for a rotary impact driver.

FIG. 4*c* shows an oblique exploded view of some of the components of the fastener installing assembly shown in FIG. 4*b*, including a guide and feed subassembly for the rotary impact driver. The housing for the rotary drill and its linear motion components includes left and right side panels [52] and a cap [55] preferably made of sheetmetal. The fastener installing assembly secures to mounting rails of the articulating frame by mounting rail grips which include gripping grooves [27a] and [28a] complementary to the mounting rails of the articulating frame. The linear motion system for driving the rotary impact drill downward as a fastener is installed includes a stationary frame or guide portion [60] and a linear excursion portion [61] which is controlled remotely by a programmable controller, a computer program, or by commands from the operator at the control console [17 of FIG. 2b.] The linear excursion portion of the linear motion system includes an upper set of guide bars [53a] and a lower set of guide bars [53b.] These guide bars are shown in solid lines in a lowered position and shown in broken lines in a raised position. Preferably as shown, the rotary impact drill or its drill bit coupled to the chuck, or both of these components are extendable along an axis transverse to an axis defined by the mounting rail.

The drill frame [50] comprises guide tubes [43] which are constrained at their ends by cross bars. The rotary impact drill is secured to the upper of the two guide tube end cross bars and also secured to an intermediate crossbar attached to the guide tubes. The guide tube [43] ends are open at their ends so that they are attached to the linear excursion portion of the linear motion system by the upper [53a] and lower [53b] sets of guide bars inserting into their complementary guide tubes. Thus, excursion of the linear motion system between its raised and lowered position couples and transmits rotary impact motion of the drill chuck to the fastener while it is being installed.

Figure 4D:
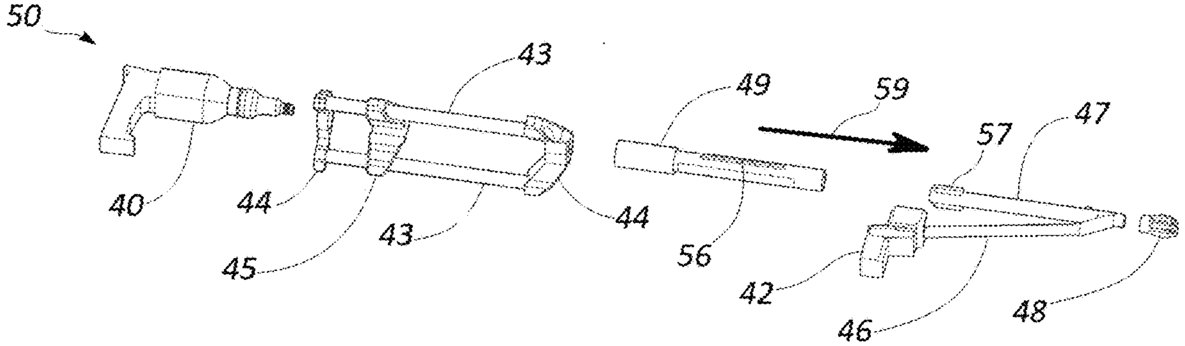
FIG. 4*d* shows an exploded view of components of the rotary impact driver guide and feed subassembly.

FIG. 4d shows an exploded view of components of the rotary impact driver guide and feed subassembly [50.] The rotary impact driver [40] is secured to a substantially rigid drill frame which comprises guide tubes [40] and two guide tube end cross bars [44.] The rotary impact drill is secured to the one of the cross bars of the drill frame and to an intermediate cross bar [45.] Fasteners are loaded and stored in bulk in a fastener magazine [42] an delivered to a fastener-orienting tip [48] through a feed tube [46] communicating between the fastener magazine and the fastener-orienting tip, which orients the fastener to be point-down and ready to penetrate the roofing material sheets. A first or lower drill bit extension shroud [47] houses an extension rod connecting the chuck of the rotary impact drill top the driving bit which engages and turns the fastener head by applying impulses of torque. In this embodiment shown the extension shroud further comprises at least one but preferably two diametrically opposed fins [57] or a radially spaced apart set of fins. Each of these fins is slidably received within a second or upper drill bit extension shroud [49.] The upper shroud includes at least one but preferably two diametrically opposed slots or a radially spaced apart set of slots.

The rotary impact driver is electrically powered, and the control and power deliver systems preferably further comprise means for monitoring electric current applied to the impact driver, such as a process controller programmed to stop the rotary impact driver when an adjustable and predetermined applied current level has been met or exceeded. While the fastener is penetrating and being drilled into place, the drill frame and the upper drill shroud are in linear motion in the direction of arrow as the drill bit maintains contact with the fastener head. The fastener magazine, the feed tube, the fastener orienting tip, and the lower shroud do not move with respect to the rest of the fastener installing assembly.

According to an alternative embodiment within the scope of the invention, the guide tubes of the drill frame may also be fixed with respect to the fastener installing assembly, and the cross bars to which the rotary impact drill attaches are slidably coupled to the guide bars so that during linear excursions the drill and its cross bars also slide along the fixed guide tubes.

While certain features and aspects have been described with respect to exemplary embodiments, one skilled in the art will recognize that numerous modifications are possible. Also, while certain functionality is ascribed to certain system components, unless the context dictates otherwise, this functionality may be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Furthermore, the procedures described with respect to one method or process may be incorporated within other described methods or processes; likewise, system components described according to a particular structural configuration and/or with respect to one system may be organized in alternative structural configurations and/or incorporated within other described systems.

The present disclosure is not to be limited in terms of the particular embodiments described in this application, which are intended as illustrations of various aspects. Many modifications and variations may be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

Hence, while various embodiments are described with or without certain features for ease of description and to illustrate exemplary aspects of those embodiments, the various components and/or features described herein with respect to a particular embodiment may be substituted, added, and/or subtracted from among other described embodiments, unless the context dictates otherwise. Thus, unauthorized instances of apparatuses and methods claimed herein are to be considered infringing, no matter where in the world they are advertised, sold, offered for sale, used, possessed, or performed.

Consequently and in summary, although many exemplary embodiments are described above, it will be appreciated that the invention is intended to cover all modifications and equivalents within the scope of the following claims.

What is claimed is:

1. A self-propelled fastener installing vehicle comprising
- a zero-radius traction system,
- a pivotable frame having at least one mounting rail,
- a plurality of fastener installing machines installed along said mounting rail,
- with any one from among said plurality of fastener installing machine further comprising
- a mounting rail grip,
- a rotary impact driver,
- a fastener magazine, and
- a fastener-orienting tip.

2. The self-propelled fastener installing vehicle of claim 1, wherein said zero-radius traction system comprises
- a source of rotary power,
- a first array of rotatable components each defining a drive axis of rotation, a second array of rotatable components spaced apart along said drive axis, and a power transmission system capable of rotating said first array of rotatable components and of counter-rotating said second array of rotatable components.

3. The self-propelled fastener installing vehicle of claim 2, wherein rotatable components from at least one array from among said first and second arrays of rotatable components are contained within a traction track.

4. The self-propelled fastener installing vehicle of claim 1, wherein said fastener installing assembly further comprises a feed tube communicating between said fastener magazine and said fastener-orienting tip.

5. The self-propelled fastener installing vehicle of claim 1, wherein said rotary impact driver is moveable along an axis transverse to an axis defined by said mounting rail.

6. The self-propelled fastener installing vehicle of claim 1, wherein said rotary impact driver is electrically powered, and further comprising means for monitoring electric current applied to said impact driver.

7. The self-propelled fastener installing vehicle of claim 6, further comprising a process controller programmed to stop said rotary impact driver when a predetermined applied current level has been met.

8. The self-propelled fastener installing vehicle of claim 1, wherein said pivotable frame further comprises a light.

9. The self-propelled fastener installing vehicle of claim 1, further comprising at least one lifting affordance.

10. A fastener installing apparatus comprising a self-propelled vehicle, a pivotable frame affixed to said vehicle, said pivotable frame further comprising a mounting rail and at least one fastener installing machine installed along said mounting rail, with said fastener installing machine further comprising a mounting rail grip, a rotary impact driver, a fastener magazine, and a fastener-orienting tip.

11. The fastener installing apparatus of claim 10, further comprising at least one power cylinder connected between a vehicle frame member and said pivotable frame.

12. The fastener installing apparatus of claim 11, further comprising a control panel mounted to said self-propelled vehicle, for actuating said power cylinder.

13. The fastener installing apparatus of claim 11, further comprising a snubber connected between a vehicle frame member and said pivotable frame.

14. The fastener installing apparatus of claim 10, wherein said self-propelled vehicle is maneuverable with a zero turning radius.

15. The fastener installing vehicle of claim 10, wherein said rotary impact driver is electrically powered, and further comprising means for monitoring electric current applied to said impact driver.

16. The fastener installing vehicle of claim 15, further comprising a process controller programmed to stop said rotary impact driver when a predetermined applied current level has been met.

17. The fastener installing vehicle of claim 10, wherein said pivotable frame further comprises a light.

18. The fastener installing vehicle of claim 10, wherein said zero-radius traction system comprises a source of rotary power, a first array of rotatable components each defining a drive axis of rotation, a second array of rotatable components spaced apart along said drive axis, and a power transmission system capable of rotating said first array of rotatable components and of counter-rotating said second array of rotatable components.

* * * * *